Patented Dec. 18, 1951

2,578,840

UNITED STATES PATENT OFFICE 2,578,840

STREPTOMYCIN PURIFICATION

Harley W. Rhodehamel, Jr., and William B. Fortune, Indianapolis, Ind., assignors to Eli Lilly and Company, Indianapolis, Ind., a corporation of Indiana No Drawing. Application July 14, 1950, Serial No. 173,934

8 Claims. (Cl. 260—210)

This invention relates to the purification of streptomycin, and more particularly to an improved process of obtaining streptomycin in purified state.

The presently employed processes of recovering streptomycin from the aqueous culture media in which the streptomycin is produced by the growth of a mold, or from aqueous solutions in which streptomycin or its salts are likewise present in impure state, require numerous process steps to obtain streptomycin of sufficient purity to be safe for administration to humans. The commonly employed purification and recovery processes require the adsorption of streptomycin on a surface-active agent and a plurality of extractive steps for removing the streptomycin from the adsorbent and for purifying it.

Because of the ready solubility of streptomycin and its common salts in water, and their very slight solubility in most organic solvents, it has been difficult if not impossible to purify streptomycin by solvent extraction processes, and to free it from chemically related impurities which inevitably are produced by the mold simultaneously with the streptomycin, and the water-soluble inorganic salt impurities which are present as constituents of the mold culture medium or are introduced by preliminary processing steps.

An object of the present invention is to provide a simple, expeditious solvent extraction process of obtaining streptomycin or its salts in purified state. Another object is to provide a process whereby streptomycin can be readily separated from inorganic or ash-forming impurities. Another object is to provide a simple extraction process whereby streptomycin is selectively extracted from streptidine, streptobiosamine-like impurities. Other objects will be apparent from the disclosure of this invention.

In accordance with the above and other objects, by this invention there is provided a process of purifying streptomycin or its salts, which in its broad aspects comprises preparing a solution of impure streptomycin or its salts in a liquid, substantially water-insoluble primary amine, and selectively separating purified streptomycin from the amine solution.

More particularly, the process comprises extracting an impure water solution of streptomycin or a salt thereof with an amine of the above-mentioned character to obtain a solution of the streptomycin in the amine, and subsequently treating the amine solution of streptomycin with water and a water-immiscible organic solvent to cause the streptomycin to pass into the aqueous phase in substantially purer state than it was in the original solution. Unlike streptomycin, the impurities which accompany streptomycin are substantially insoluble in the amine used for extraction, and so are left behind. Furthermore, dihydrostreptomycin is substantially insoluble in the amine, and therefore the process provides means for removing dihydrostreptomycin from streptomycin.

The amines which are suitable for the purposes of this invention are the primary alkyl and primary aralkyl amines which are immiscible with water and are liquid at ordinary temperatures, such as for example, n-hexylamine, 2-aminoheptane, 2-ethylhexylamine, octylamine, decylamine, 2-ethylbutylamine, benzylamine and the like. By ordinary temperatures are meant temperatures in the range of about 10° C to about 45° C.

The water-immiscible organic solvent used to cause the streptomycin to pass from the amine solution into the water to form a purified water solution of streptomycin can be any of the common water-immiscible solvents, illustrative examples of which are chloroform, amyl acetate, n-butanol and the like. It will be seen from the foregoing list of solvents that the solvent employed is one which is completely miscible with the water-immiscible amine used.

A preferred manner of carrying out the invention is as follows:

A water solution of impure streptomycin salt is saturated with sodium chloride, and the solution is adjusted to moderate alkalinity, i. e. pH 8 to pH 12, by the addition of aqueous alkali, although such adjustment is not necessary to successful operation of the process since the amines used for the extraction are themselves sufficiently basic in nature to provide an alkaline aqueous medium. The solution is thoroughly mixed with about one tenth its volume of a primary amine of the character set forth above, and the mixture is allowed to separate, and the amine layer containing the streptomycin is separated. The volume of the amine solution is reduced to about one third its original volume as by evaporation in vacuo, and is filtered or centrifuged to remove sodium chloride and any other inorganic impurities which have separated. The filtrate containing the streptomycin is treated with several times its volume of a water-immiscible organic solvent, a volume of water equal to the amine solution is added, and the mixture is well agitated. The mixture is allowed to separate and the water phase which contains the streptomycin in purified condition is removed.

From this water phase the streptomycin can be recovered by any of the known methods of recovering streptomycin.

The water solution of streptomycin contains a small amount of dissolved primary amine which if desired can be removed prior to the recovery of the streptomycin. Preferably the dissolved amine is removed, and its removal is readily accomplished by treating the water solution with an equal volume of a mixture of a water-immiscible solvent and a carbonyl-containing compound, i. e., an aldehyde or ketone.

The water-immiscible solvent can be any solvent of the character of those specified hereinabove which are used to cause separation of the streptomycin from the amine solution thereof. A wide variety of aldehydes and ketones are suitable for the removal of the small amount of amine, including acetone, salicylaldehyde, benzaldehyde, cyclohexanone, and the like. It appears that the aldehydes and ketones which are most suitable are those which contain relatively reactive keto groups, and it is believed, although it is not established, that the carbonyl group combines to a degree with the amino group of the amine, thereby reducing the slight water solubility of the amine and assisting in the removal of the amine from the water. The relative amounts of water-immiscible solvent and aldehyde or ketone in the extracting mixture are not critical. It will be apparent, however, that in the event a water-soluble aldehyde or ketone is employed in the mixture, the amount of organic solvent employed should be sufficient to prevent undue loss of the aldehyde or ketone in the water phase.

Specific examples illustrative of the method of carrying out the novel process and variations which may be made therein are as follows. It will be recognized by those skilled in the art that other variations may be made without departing from the scope of the invention.

Example 1

50 liters of an aqueous streptomycin sulfate solution assaying approximately 4,000 units per cc. and containing 0.3 g. of sodium chloride per cc., were adjusted to pH 12 with solid sodium hydroxide. The alkaline solution was extracted with 3.5 liters of 2-aminoheptane, with vigorous stirring. The mixture was permitted to stand and the two phases which formed were separated. The 2-aminoheptane phase, which contained 95 percent of the original streptomycin, was removed and concentrated in vacuo to 1.2 liters, approximately one third its original volume, and filtered. To the filtrate were added 3.5 liters of chloroform and 1.2 liters of water. The mixture was well stirred, and the water phase containing the streptomycin activity was allowed to separate and was then removed. The water solution of streptomycin was extracted with a mixture of 600 cc. of acetone and 1.2 liters of chloroform to remove residual 2-aminoheptane. The water phase was then adjusted to pH 5.3 with sulfuric acid, and the water was removed by drying in vacuo to yield 192 g. of streptomycin sulfate assaying about 730 units per mg.

Example 2

5 liters of streptomycin hydrochloride solution assaying 350,000 units per cc. and having a pH of 7 were extracted with an equal volume of hexylamine. The hexylamine was removed and the water phase was extracted with a further 1.3 liter portion of hexylamine. The combined hexylamine extracts were treated with a mixture of 6 liters of water and 18 liters of chloroform. The mixture was well stirred and was then allowed to separate into layers. The water layer, containing the streptomycin, was extracted with a mixture of 3 liters of cyclohexanone and 6 liters of amyl acetate, to remove any residual amine. The streptomycin-containing water solution was then adjusted to about pH 6.0 with sulfuric acid, and the solution was dried in vacuo, yielding 2.3 kg. of streptomycin sulfate assaying about 500 units per mg.

Example 3

To 50 cc. of an aqueous solution of streptomycin phosphate, assaying 100,000 units per cc., were added 15 g. of sodium chloride. The pH of the solution was adjusted to pH 12 with solid sodium hydroxide. The solution was then extracted with 25 cc. of benzylamine, with vigorous stirring. On standing, two layers formed, and the benzylamine layer was removed. The benzylamine solution, containing most of the streptomycin originally present, was extracted with a mixture of about 75 cc. of chloroform and 25 cc. of water. The resulting mixture separated into two phases and the aqueous phase, now containing the streptomycin, was removed and was washed with about 25 cc. of salicylaldehyde to remove excess benzylamine. The solution was adjusted to about pH 5.3 with hydrochloric acid, and evaporated to dryness in vacuo. 4.3 g. of streptomycin hydrochloride, assaying about 680 units per mg., were recovered.

Example 4

A mixture of 45 cc. of streptomycin sulfate solution assaying approximately 300,000 units per cc. of activity and previously adjusted to pH 12, 22 cc. of octylamine, and 13.5 g. of sodium chloride was stirred thoroughly for 15 minutes. On standing, the mixture separated into two phases, and the octylamine phase was removed. The octylamine, containing the major portion of the streptomycin originally present, was extracted with a mixture of about 65 cc. of chloroform and 20 cc. of water. Again two phases formed, and the water phase, now containing the streptomycin, was removed. The water phase was then washed with about 20 cc. of a mixture containing 6 cc. of acetone and 14 cc. of chloroform to remove any residual octylamine. The water solution was adjusted to about pH 5.3 with hydrochloric acid, and on drying in vacuo, streptomycin hydrochloride was recovered.

Example 5

38 cc. of a solution of streptomycin sulfate assaying approximately 105,000 units per cc. were adjusted to about pH 12 with barium hydroxide. The precipitate of barium sulfate which formed was filtered off, and to the filtrate were added 12 g. of sodium chloride. The solution was extracted with 38 cc. of 2-ethylhexylamine. A two-phase system formed on standing, and the 2-ethylhexylamine phase was removed. On testing the potency of the 2-ethylhexylamine solution microbiologically, it was found that over 95 percent of the streptomycin originally present had been extracted. By following the isolation procedure of Example 2, streptomycin sulfate was recovered.

Example 6

25 g. of streptomycin sulfate, assaying 525 units per mg. were dissolved in 500 cc. of water, 150 g. of sodium chloride were added, and the pH of the solution was adjusted to about pH 12 with sodium hydroxide. The resulting solution was extracted with 250 cc. of 2-aminoheptane. The 2-aminoheptane solution, containing 96 percent of the original streptomycin activity, was concentrated in vacuo to a volume of about 85 cc. The concentrated amine solution was filtered, and the residue was washed with 10 cc. of 2-aminoheptane. The combined filtrate and washings were extracted with a mixture of 450 cc. of chloroform and 150 cc. of water. The water phase was removed, adjusted to pH 1.5 with hydrochloric acid and dried in vacuo to yield 13.9 g. of streptomycin hydrochloride testing 620 units per mg. The dry material was dissolved in 700 cc. of absolute methanol and 5 g. of anhydrous calcium chloride were added thereto. The solution was concentrated in vacuo to a volume of about 400 cc., and allowed to stand in the refrigerator for 24 hours. Crystals of the calcium chloride salt of streptomycin hydrochloride precipitated and were filtered off and dried. 9.2 g. of the crystalline calcium chloride complex of streptomycin hydrochloride were recovered.

We claim:

1. The process for the purification of streptomycin which comprises extracting an aqueous solution containing crude streptomycin with a water-immiscible amine of the group consisting of liquid primary alkyl and liquid primary aralkyl amines, concentrating the amine extract, and removing insoluble impurities therefrom, adding to the amine extract a water-immiscible organic solvent, extracting the resulting solution with water, separating the water phase, washing the water phase with a mixture of a carbonyl-containing compound and a water-immiscible organic solvent to remove residual amine therefrom, and recovering the purified streptomycin from the water solution.

2. The process for the purification of streptomycin which comprises extracting an aqueous solution containing streptomycin with a water-immiscible amine of the group consisting of liquid primary alkyl and liquid primary aralkyl amines, adding to the amine extract a water-immiscible organic solvent, extracting the resulting solution with water, separating the water phase, and isolating the streptomycin therefrom.

3. In the process for the purification of streptomycin according to claim 2, the step which comprises preparing a solution of streptomycin in a liquid water-immiscible amine of the group consisting of primary alkyl and primary aralkyl amines.

4. The process according to claim 2, wherein the amine is 2-aminoheptane.

5. The process according to claim 2, in which the amine is benzylamine.

6. The process according to claim 2, in which the amine is n-hexylamine.

7. The process according to claim 2, in which the amine is octylamine.

8. The process according to claim 2, in which the amine is 2-ethylhexylamine.

HARLEY W. RHODEHAMEL, Jr.
WILLIAM B. FORTUNE.

REFERENCES CITED

The following references are of record in the file of this patent:

UNITED STATES PATENTS

| Number | Name | Date |
|---|---|---|
| 2,446,102 | Peck | July 27, 1948 |
| 2,509,191 | Lott et al. | May 23, 1950 |
| 2,537,941 | Regna et al. | Jan. 9, 1951 |

OTHER REFERENCES

Carter: J. Biol. Chem. V. 160 (1945), pp. 337–342.